Patented Feb. 20, 1934

1,947,952

UNITED STATES PATENT OFFICE 1,947,952

PROCESS OF PREPARING ALKALINE EARTH METAL OXIDES

Oswin Nitzschke, Leverkusen - on - the - Rhine, Germany, assignor to I. G. Farbenindustrie Aktiengesellschaft, Frankfort - on - the - Main, Germany No Drawing. Application September 20, 1930, Serial No. 483,384, and in Germany October 1, 1929

3 Claims. (Cl. 23—186)

The present invention relates to a new process of preparing alkaline earth metal oxides especially barium and strontium oxide and consists in reacting upon alkaline earth metal carbonates with hydrogen at temperatures between 700 and 1000° C. preferably in presence of a small amount of carbonaceous matter.

The preparation of alkaline earth metal oxides on a technical scale from the carbonates has been effected up to now with calcium and strontium by burning in shaft or revolving furnaces, whereby temperatures of 800 and 1200° C. respectively were necessary, and with barium by heating a mixture of carbonate and coal in small crucibles at 1200° C.

According to the present invention alkaline earth metal oxides may be prepared by heating the respective carbonates in a stream of hydrogen at a temperature of between 700° and 1000° C. preferably in the presence of 2–10% of soot, coal, coke or other carbonaceous matter. From strontium or barium carbonate, to which 6% by weight of coal is added, in a hydrogen stream at 800–850° C. an oxide can be obtained which is very loose and contains no carbonate and which is very well suitable for the preparation of peroxide. Another advantage of the new process lies in the fact that iron can be used as the material for the apparatus, and that even in the burning of barium carbonate no baking on the sides of the apparatus occurs. It is possible therefore, to effect the burning of a barium carbonate in a revolving furnace, which was impossible up to now, since barium carbonate melts down at about 1000° C. long before it gives up carbonic acid under normal conditions or in the presence of carbon.

My invention is illustrated by the following examples without being restricted thereto:

*Example 1.*—Strontium carbonate is heated to about 800° C. in an iron revolving furnace which is heated from the outside; the air is then displaced by nitrogen and thereafter hydrogen is passed through the furnace. A mixture of carbon monoxide, water and hydrogen escapes from the furnace which mixture can be used for heating purposes, preferably after the separation of the water. After two to three hours the carbonate is converted into pure strontium oxide.

*Example 2.*—A mixture of 200 parts by weight of barium carbonate and 12 parts by weight of soot is heated in an iron revolving furnace at 800–850° C. in a current of hydrogen. The gas leaving the furnace consists essentially of carbon monoxide, hydrogen and water and may be used for the heating of the furnace. The barium oxide obtained, which sometimes has a grey color due to residues of the soot, yields a 90% superoxide when heated to about 600° C. in an oxygen stream.

I claim:

1. A process of preparing alkaline earth metal oxides which comprises heating an alkaline earth metal carbonate at 700–1000° C. in a hydrogen atmosphere in the presence of carbonaceous matter.

2. A process of preparing alkaline earth metal oxides which comprises heating an alkaline earth metal carbonate at 700–1000° C. in a hydrogen atmosphere in the presence of 2–10% by weight of carbonaceous matter.

3. A process of preparing barium oxide which comprises heating barium carbonate at 700–1000° C. in a hydrogen atmosphere in the presence of 2–10% by weight of carbonaceous matter.

OSWIN NITZSCHKE.